United States Patent [19]

Pope

[11] 4,319,944
[45] Mar. 16, 1982

[54] PROCESS FOR REINFORCING A THERMOPLASTIC BODY

[75] Inventor: Carl M. Pope, Dunwoody, Ga.

[73] Assignee: Gulf Plastic Fabricated Products Company, Norcross, Ga.

[21] Appl. No.: 158,483

[22] Filed: Jun. 11, 1980

[51] Int. Cl.³ ............................................. B65H 81/00
[52] U.S. Cl. ................................ 156/195; 156/244.13
[58] Field of Search ............................ 156/195, 244.13

[56] References Cited

U.S. PATENT DOCUMENTS 3,300,355 1/1967 Adams ...................... 156/244.13 X

*Primary Examiner*—David A. Simmons
*Attorney, Agent, or Firm*—Deane E. Keith; Forrest D. Stine; Joseph J. Carducci

[57] ABSTRACT

A process for reinforcing a thermoplastic body composed of an organic thermoplastic polymer which comprises extruding a strip of hot organic thermoplastic polymer, passing said strip of hot organic thermoplastic polymer and a strip of superimposed fabric onto a surface, applying pressure to said superimposed strips sufficiently to at least partially embed said fabric into said organic thermoplastic polymer and thereafter cooling the resulting product to obtain a permanent mechanical bond between said fabric and said organic thermoplastic polymer.

7 Claims, 2 Drawing Figures

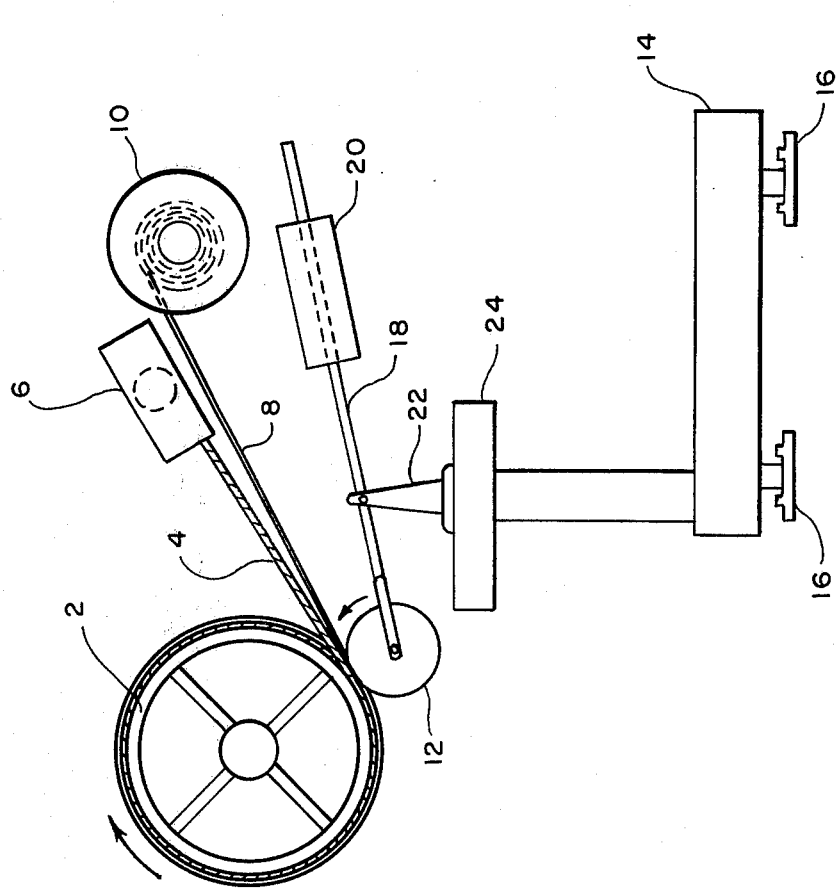

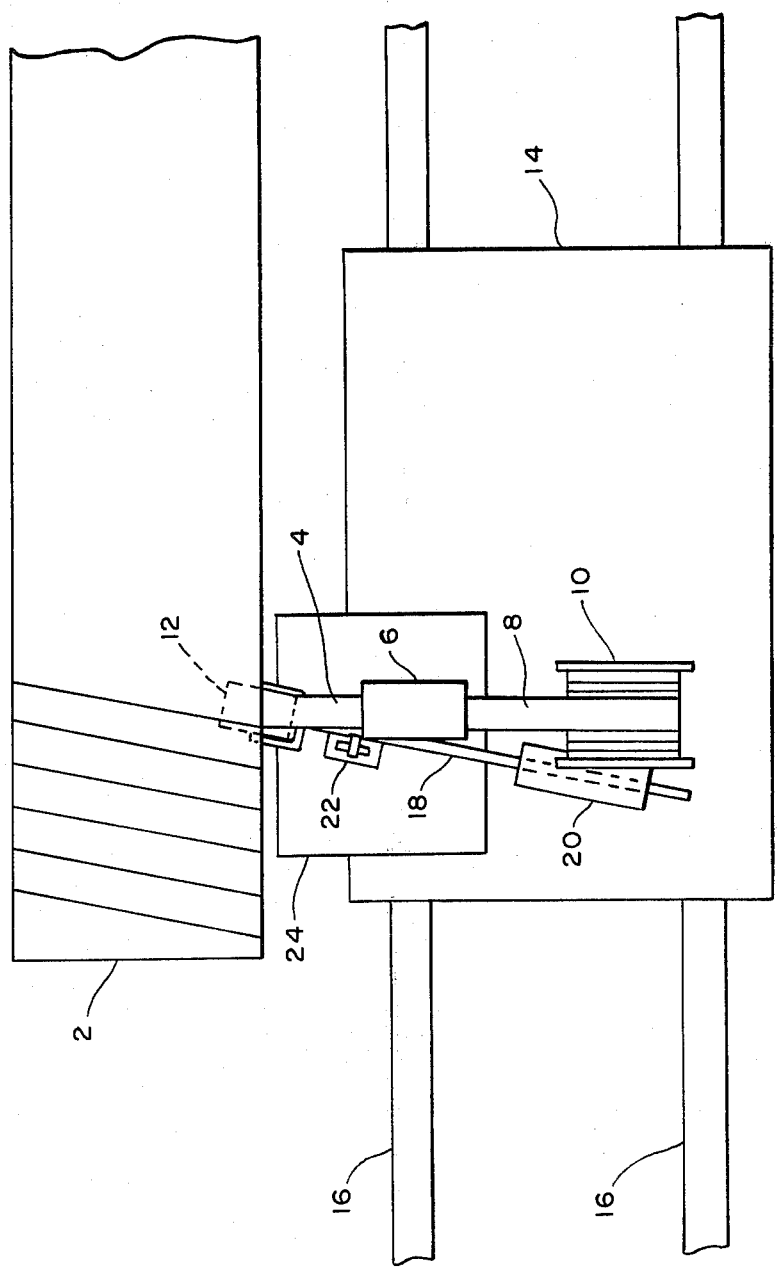
Fig. II

PROCESS FOR REINFORCING A THERMOPLASTIC BODY

BACKGROUND OF THE INVENTION

1. Field of the Invention

The present invention relates to a process for reinforcing a thermoplastic body composed of an organic thermoplastic polymer which comprises extruding a strip of hot organic thermoplastic polymer, passing said strip of hot organic thermoplastic polymer and a strip of superimposed fabric onto a surface, applying pressure to said superimposed strips sufficiently to at least partially embed said fabric into said organic thermoplastic polymer and thereafter cooling the resulting product to obtain a permanent mechanical bond between said fabric and said organic thermoplastic polymer.

2. Description of the Prior Art

It is known that thermoplastic bodies composed of one or more organic thermoplastic polymers lack structural strength and/or rigidity. While in some cases such deficiencies are not detrimental, in many cases, however, such thermoplastic bodies must be subjected to further processing to increase their strength and/or rigidity before they can be effectively utilized. For example, Shaw in U.S. Pat. No. 4,104,095, discloses a process for reinforcing a tubular article composed of an organic thermoplastic polymer with a fabric which comprises helically wrapping a fabric around the outer surface of a preformed tubular article, applying heat to the wrapped tubular article sufficient to simultaneously melt the exterior surface of the tubular article and thermally expand the tubular article outwardly into the openings in the fabric and then cooling the wrapped tubular article to obtain a permanent mechanical bond between the fabric and the tubular article.

SUMMARY OF THE INVENTION

I have found that a thermoplastic body composed of an organic thermoplastic polymer can be reinforced to increase its strength and/or rigidity while it is being formed in a one-step process which comprises extruding a strip of hot organic thermoplastic polymer, passing said strip of hot organic thermoplastic polymer and a strip of superimposed fabric onto a surface, applying pressure to said superimposed strips sufficiently to at least partially embed said fabric into said organic thermoplastic polymer and thereafter cooling the resulting product to obtain a permanent mechanical bond between said fabric and said organic thermoplastic polymer. In a preferred embodiment, for example, wherein it is desired to prepare a final reinforced tubular article, as in the Shaw patent referred to above, the superimposed strips of hot organic thermoplastic polymer and fabric are helically wound upon a rotating mandrel to obtain a reinforced cylindrical tube or pipe thereon. Preferably, pressure is brought to bear upon said superimposed strips or layers by passing the same between said rotating mandrel and a pressure roller in close proximity to said mandrel.

The invention will be further illustrated by reference to the accompanying drawings which illustrate a specific embodiment of the invention. FIG. I shows a diagrammatic side elevational view of a device for simultaneously forming and reinforcing a tubular article in accordance with the novel process herein. FIG. II is a partial plan view of the device of FIG. I.

Referring to the drawings a stationery cylindrical mandrel 2 is rotated in the direction of the arrow in FIG. I by any suitable means, which have not been shown. At the same time a strip of hot organic thermoplastic polymer 4 is extruded from die head 6 and a strip of fabric 8 is unwound from reel 10, superimposed, one upon the other, and then passed between mandrel 2 and pressure roller 12 rotating in the direction of the arrow in FIG. I. Upon movement of said superimposed layers between the mandrel and the pressure roller the fabric will become at least partially embedded in the polymer and the polymer, as nodules, will protrude into the openings of the fabric and at least partially around individual fibers of said fabric. Upon subsequent cooling the nodules will mechanically interlock with the fibers of the fabric, resulting in a strong mechanical bond between the fabric and the polymer.

As shown in FIG. II, extruder die head 6, reel 10 and pressure roller 12 are mounted, by means not shown, on carriage 14, which is movable on tracks 16, by means not shown, in the direction of the arrow, parallel to the rotating axis of the mandrel 2. In the preferred embodiment herein, as the mandrel rotates and the carriage moves in the direction of the arrow, the superimposed layers of extruded polymer and fabric are helically wound upon the mandrel, with each layer of polymer as it reaches the mandrel surface overlapping a previous layer thereon, so that as the carriage traverses the mandrel length and the superimposed layers of polymer and fabric reach the end of the mandrel a seamless reinforced tubular article is obtained. Once cooled the tubular article so produced can be removed from the mandrel in any suitable manner. A suitable expedient would involve using a collapsible mandrel to expedite removal of the product tubular article therefrom. Upon cooling of the tubular article the nodules of polymer will be rigid and will mechanically interlock with the fibers of the fabric, resulting in a permanent mechanical bond between the polymer and the fabric.

By the term "organic thermoplastic polymer" I intend to include any organic polymer, natural or synthetic, which in its final state, for example at ambient temperature and pressure, is capable of being repeatedly softened by increase of temperature and hardened by decrease of temperature. Examples of especially preferred organic thermoplastic polymers are olefinic polymers, such as polyethylene, polypropylene and polybutylene, halogenated olefinic polymers, such as polyvinylchloride and polyvinylidene chloride, copolymers, such as ethylene-butylene copolymers, ethylene-hexene copolymers and ethylene-octene copolymers, etc.

Any fabric or cloth, of the woven or knit type, having a coefficient of thermal expansion less than the coefficient of thermal expansion of the organic thermoplastic polymer can be used. Thus, fabrics or cloths made of glass fibers, of metals, such as aluminum, etc., can be used.

The temperature of the organic thermoplastic polymer upon extrusion from the die head for use herein will vary over a wide range, but in general will be in the range of about 150° C. to about 290° C., preferably about 175° C. to about 245° C. The surface upon which the superimposed layers or strips of hot organic thermoplastic polymer and fabric are applied can be at ambient temperature if the surface is a good insulator, but in order to minimize shrinkage of the organic thermoplastic polymer if the surface has a high coefficient of thermal conductivity, for example, a metal, such as steel, it is preferred to maintain the surface at a temperature in the range of about 65° to about 140° C., preferably about 100° to about 125° C.

The amount of pressure applied to the superimposed layers of organic thermoplastic polymer and fabric can vary over a wide range as long as such pressure is sufficient to embed the fabric in the hot organic thermoplastic polymer and to cause flow of the hot organic thermoplastic polymer into the openings in the fabric. Thus the pressure can be in the range of about 150 to about 400 pounds per square inch gauge (about 1034 to about 2768 kPa), preferably in the range of about 250 to about 300 pounds per square inch gauge (about 1724 to about 2068 kPa). In the preferred embodiment, wherein a reinforced tubular article is desired, a pressure sufficient to effect the desired result is obtained by using a teflon roller to press the layers together. As shown in FIG. I, pressure roller 12 is rotatably connected to arm 18 having a suitable weight 20 at the other end thereof, with arm 18 pivotally mounted on fulcrum 22 between pressure roller 12 and weight 20. By moving the weight 20 along the arm 18, the pressure on pressure roller 12 can be varied as desired. As further shown in FIG. I, fulcrum 20 is fixedly attached to mounting table 24, which, in turn, is fixedly mounted to carriage 14. Carriage 14 is provided with rollers 26 for movement on tracks 16.

The thickness of each of the hot extruded organic thermoplastic polymer and the fabric can also vary over a wide range, for example, from about 0.125 to about six inches (about 0.3175 to about 15.24 centimeters), preferably about 0.125 to about two inches (about 0.3175 to about 5.08 centimeters).

DESCRIPTION OF PREFERRED EMBODIMENTS

In a preferred embodiment, a mandrel made of steel, having an inner diameter of 60.41 inches (153.44 centimeters), an outer diameter of 60.91 inches (154.71 centimeters) and a length of 21.0 feet (6.4 meters), whose surface is maintained at 115.5° C., rotating at 130 surface inches per minute is used. A carriage is provided moving parallel to the mandrel at the rate of 2.76 inches (7.01 centimeters) per minute in the direction of the arrow in FIG. II, upon which there are mounted an extruder, a reel and a pressure roller. From the die head there is extruded a strip of polyethylene (Melt Index 0.06 to 0.20, D-1238, Condition E) having a width of four inches (10.16 centimeters) and a thickness of 0.25 inches (0.635 centimeters) and from the reel a strip of glass fabric having a width of 3.5 inches (8.90 centimeters) and a thickness of 0.015 inches (0.038 centimeters). The two layers are superimposed upon each other, and, at the rate of 2.71 inches (7.01 centimeters) per minute, are passed between the mandrel and a pressure roller as shown in FIG. I. The pressure roller, made of Teflon, has a diameter of six inches (15.24 centimeters). The pressure exerted by the pressure roller on the material passing between it and the mandrel is about 250 pounds per square inch gauge (1724 kPa). After passing between the mandrel and the adjacent pressure roller the superimposed layers are helically wound upon the mandrel, with a portion of the layers thereon overlapping a previous layer, until the end of the mandrel is reached. The superimposed layers are allowed to cool, after which the mandrel is collapsed, and the resulting reinforced tubular article is removed therefrom and allowed to cool to ambient temperature. Upon cooling a permanent mechanical bond is obtained between the organic thermoplastic polymer and the glass fabric. If desired, after the tubular article has been produced it can be wrapped with a glass mat, which, in turn, can be impregnated with a resin, such as a polyester resin. Upon curing, the resin will bond the glass mat to the fabric embedded in the organic thermoplastic polymer and will provide rigidity and strength to the composite tubular structure.

Obviously, many modifications and variations of the invention, as hereinabove set forth, can be made without departing from the spirit and scope thereof, and therefore only such limitations should be imposed as are indicated in the appended claims.

We claim:

1. A process for reinforcing a thermoplastic body composed of an organic thermoplastic polymer which comprises extruding a strip of hot organic thermoplastic polymer in a temperature range of about 150° to about 290° C., passing said strip of hot organic thermoplastic polymer and a strip of superimposed fabric onto a rotating cylindrical mandrel having a metal surface maintained at a temperature in the range of about 65° to about 140° C., helically winding said superimposed strips onto said cylindrical mandrel, with each layer of said polymer as it reaches the surface of said mandrel overlapping a previous polymer layer thereon, applying pressure of about 150 to about 400 pounds per square inch gauge to said superimposed strips sufficiently to at least partially embed said fabric into said organic thermoplastic polymer and to cause said polymer, as nodules, to protrude into the openings of said fabric and at least partially around individual fibers of said fabric by passing said strips between said cylindrical mandrel and a smooth pressure roller in close proximity to said cylindrical mandrel and thereafter cooling the resulting product to obtain a permanent mechanical bond between said fabric and said organic thermoplastic polymer, thereby forming a reinforced tubular article.

2. The process of claim 1 wherein said organic thermoplastic polymer is polyethylene.

3. The process of claim 1 wherein said fabric is composed of glass fibers.

4. The process of claim 1 wherein said hot organic thermoplastic polymer is in the temperature range of about 175° to about 245° C.

5. The process of claim 1 wherein the said superimposed strips are applied to said mandrel from a carriage moving parallel to the rotating axis of said mandrel.

6. The process of claim 1 wherein the surface of said cylindrical mandrel is in the temperature range of about 100° to about 125° C.

7. The process of claim 1 wherein said pressure is in the range of about 250 to about 300 pounds per square inch gauge.

* * * * *